United States Patent
Winokur et al.

(10) Patent No.: US 9,195,397 B2
(45) Date of Patent: Nov. 24, 2015

(54) DISASTER-PROOF DATA RECOVERY

(71) Applicant: AXXANA (ISRAEL) LTD., Tel Aviv (IL)

(72) Inventors: Alex Winokur, Haifa (IL); Gil Chaouat, Tel Aviv (IL); Eliahou Orr, Rehovot (IL)

(73) Assignee: AXXANA (ISRAEL) LTD., Tel Aviv (IL)

( * ) Notice: Subject to any disclaimer, the term of this patent is extended or adjusted under 35 U.S.C. 154(b) by 188 days.

(21) Appl. No.: 13/948,179

(22) Filed: Jul. 23, 2013

(65) Prior Publication Data

US 2013/0311736 A1     Nov. 21, 2013

Related U.S. Application Data

(63) Continuation-in-part of application No. 13/151,289, filed on Jun. 2, 2011, now Pat. No. 8,914,666, which is a continuation of application No. 12/721,580, filed on Mar. 11, 2010, now Pat. No. 7,996,709, which is a
(Continued)

(51) Int. Cl.
| | |
|---|---|
| *G06F 11/00* | (2006.01) |
| *G06F 3/06* | (2006.01) |
| *G06F 11/14* | (2006.01) |
| *G06F 11/20* | (2006.01) |

(52) U.S. Cl.
CPC .............. *G06F 3/0619* (2013.01); *G06F 3/067* (2013.01); *G06F 3/0655* (2013.01); *G06F 11/1441* (2013.01); *G06F 11/1446* (2013.01); *G06F 11/1471* (2013.01); *G06F 11/2058* (2013.01); *G06F 11/2074* (2013.01); *G06F 11/2082* (2013.01); *G06F 11/2012* (2013.01)

(58) Field of Classification Search
CPC ............ G06F 11/1446; G06F 11/1471; G06F 11/1448
See application file for complete search history.

(56) References Cited

U.S. PATENT DOCUMENTS

| | | |
|---|---|---|
| 3,140,847 A | 7/1964 | Ames |
| 5,027,104 A | 6/1991 | Reid |
| 5,546,533 A | 8/1996 | Koyama |
| 5,594,900 A | 1/1997 | Cohn et al. |

(Continued)

FOREIGN PATENT DOCUMENTS

| | | |
|---|---|---|
| EP | 0420425 A2 | 4/1991 |
| GB | 2273180 A | 6/1994 |

(Continued)

OTHER PUBLICATIONS

U.S. Appl. No. 13/395,673 Office Action dated Dec. 31, 2013.
(Continued)

*Primary Examiner* — Yolanda L Wilson
(74) *Attorney, Agent, or Firm* — D. Kligler I.P. Services Ltd

(57) ABSTRACT

A recovery unit for recovering data includes an antenna and a first wireless transceiver. The first wireless transceiver is configured to communicate via the antenna only with a second wireless transceiver of a storage unit that holds records associated with the data. When an event damaging at least some of the data occurs and the recovery unit is brought into proximity with the storage unit, the recovery unit receives the records from the storage unit for recovery of the data.

22 Claims, 9 Drawing Sheets

Related U.S. Application Data continuation of application No. 10/585,587, filed as application No. PCT/IL2006/000453 on Apr. 10, 2006, now Pat. No. 7,707,453, which is a continuation-in-part of application No. 13/132,921, filed as application No. PCT/IB2010/050041 on Jan. 7, 2010, now abandoned.

(60) Provisional application No. 60/673,664, filed on Apr. 20, 2005, provisional application No. 60/729,112, filed on Oct. 20, 2005, provisional application No. 61/143,842, filed on Jan. 12, 2009.

(56) References Cited

U.S. PATENT DOCUMENTS

| | | | |
|---|---|---|---|
| 5,623,597 | A | 4/1997 | Kikinis |
| 5,680,579 | A | 10/1997 | Young et al. |
| 5,724,501 | A | 3/1998 | Dewey et al. |
| 5,799,141 | A | 8/1998 | Galipeau et al. |
| 5,841,768 | A | 11/1998 | Ozluturk et al. |
| 5,889,935 | A | 3/1999 | Ofek et al. |
| 6,105,078 | A | 8/2000 | Crockett et al. |
| 6,144,999 | A | 11/2000 | Khalidi et al. |
| 6,158,833 | A | 12/2000 | Engler |
| 6,173,377 | B1 | 1/2001 | Yanai et al. |
| 6,226,651 | B1 | 5/2001 | Masuda et al. |
| 6,260,125 | B1 | 7/2001 | McDowell et al. |
| 6,298,290 | B1 | 10/2001 | Abe et al. |
| 6,324,654 | B1 | 11/2001 | Wahl et al. |
| 6,389,552 | B1* | 5/2002 | Hamilton et al. ............ 714/4.21 |
| 6,400,730 | B1 | 6/2002 | Latif et al. |
| 6,574,538 | B2 | 6/2003 | Sasaki |
| 6,580,450 | B1 | 6/2003 | Kersting et al. |
| 6,658,590 | B1 | 12/2003 | Sicola et al. |
| 6,684,306 | B1 | 1/2004 | Nagasawa et al. |
| 6,816,480 | B1 | 11/2004 | Monroe et al. |
| 6,842,825 | B2 | 1/2005 | Geiner et al. |
| 6,859,865 | B2 | 2/2005 | De Margerie |
| 6,954,875 | B2 | 10/2005 | Liu |
| 6,976,186 | B1 | 12/2005 | Gardner |
| 7,020,743 | B2 | 3/2006 | Lee et al. |
| 7,065,589 | B2 | 6/2006 | Yamagami |
| 7,111,189 | B1 | 9/2006 | Sicola et al. |
| 7,114,094 | B2 | 9/2006 | Soejima |
| 7,120,834 | B1 | 10/2006 | Bishara |
| 7,148,802 | B2 | 12/2006 | Abbruscato et al. |
| 7,185,228 | B2 | 2/2007 | Achiwa |
| 7,188,292 | B2 | 3/2007 | Cordina et al. |
| 7,302,506 | B2 | 11/2007 | Harima et al. |
| 7,383,405 | B2 | 6/2008 | Vega et al. |
| 7,386,376 | B2 | 6/2008 | Basir et al. |
| 7,451,355 | B1 | 11/2008 | Coatney et al. |
| 7,478,266 | B2 | 1/2009 | Gatto et al. |
| 7,487,311 | B2 | 2/2009 | Stroberger et al. |
| 7,548,560 | B1 | 6/2009 | Dropps et al. |
| 7,577,724 | B1 | 8/2009 | Jalagam et al. |
| 7,577,807 | B2 | 8/2009 | Rowan et al. |
| 7,657,578 | B1 | 2/2010 | Karr et al. |
| 7,668,177 | B1 | 2/2010 | Trapp et al. |
| 7,707,460 | B2 | 4/2010 | Hyde, II et al. |
| 7,797,582 | B1 | 9/2010 | Stager et al. |
| 2001/0047412 | A1 | 11/2001 | Weinman |
| 2002/0162112 | A1 | 10/2002 | Javed |
| 2002/0176417 | A1 | 11/2002 | Wu et al. |
| 2002/0188392 | A1 | 12/2002 | Breed et al. |
| 2003/0014523 | A1 | 1/2003 | Teloh et al. |
| 2003/0093541 | A1 | 5/2003 | Lolayekar et al. |
| 2003/0097607 | A1* | 5/2003 | Bessire ............ 714/5 |
| 2003/0115324 | A1 | 6/2003 | Blumenau et al. |
| 2003/0204597 | A1 | 10/2003 | Arakawa et al. |
| 2004/0012316 | A1 | 1/2004 | Davis |
| 2004/0030837 | A1 | 2/2004 | Geiner et al. |
| 2004/0044649 | A1 | 3/2004 | Yamato et al. |
| 2004/0044865 | A1 | 3/2004 | Sicola et al. |
| 2004/0059844 | A1 | 3/2004 | Jones et al. |
| 2004/0064639 | A1 | 4/2004 | Sicola et al. |
| 2004/0073831 | A1 | 4/2004 | Yanai et al. |
| 2004/0083245 | A1 | 4/2004 | Beeler |
| 2004/0153717 | A1 | 8/2004 | Duncan |
| 2004/0193658 | A1 | 9/2004 | Kawamura et al. |
| 2004/0193802 | A1 | 9/2004 | Meiri et al. |
| 2004/0230352 | A1 | 11/2004 | Monroe |
| 2004/0260873 | A1 | 12/2004 | Watanabe |
| 2004/0267516 | A1* | 12/2004 | Jibbe et al. ............ 703/24 |
| 2005/0005001 | A1 | 1/2005 | Hara et al. |
| 2005/0015657 | A1 | 1/2005 | Sugiura et al. |
| 2005/0027892 | A1 | 2/2005 | McCabe et al. |
| 2005/0243609 | A1 | 11/2005 | Yang et al. |
| 2005/0257015 | A1 | 11/2005 | Hiraiwa et al. |
| 2005/0280421 | A1 | 12/2005 | Yomoda et al. |
| 2006/0025897 | A1 | 2/2006 | Shostak et al. |
| 2006/0031468 | A1 | 2/2006 | Atluri et al. |
| 2006/0051157 | A1 | 3/2006 | Bornstein et al. |
| 2006/0072580 | A1 | 4/2006 | Dropps et al. |
| 2006/0075148 | A1 | 4/2006 | Osaki |
| 2006/0274755 | A1 | 12/2006 | Brewer et al. |
| 2006/0284214 | A1 | 12/2006 | Chen |
| 2007/0079088 | A1 | 4/2007 | Deguchi et al. |
| 2007/0094467 | A1 | 4/2007 | Yamasaki |
| 2007/0124789 | A1 | 5/2007 | Sachson et al. |
| 2007/0198613 | A1 | 8/2007 | Prahlad et al. |
| 2007/0226438 | A1 | 9/2007 | Erofeev |
| 2007/0266197 | A1 | 11/2007 | Neyama et al. |
| 2007/0271313 | A1 | 11/2007 | Mizuno et al. |
| 2008/0001128 | A1 | 1/2008 | Goldberg |
| 2008/0004904 | A1 | 1/2008 | Tran |
| 2008/0061963 | A1 | 3/2008 | Schnitz et al. |
| 2008/0104443 | A1 | 5/2008 | Akutsu et al. |
| 2008/0177964 | A1 | 7/2008 | Takahashi et al. |
| 2008/0201390 | A1 | 8/2008 | Anguelov |
| 2008/0263363 | A1 | 10/2008 | Jueneman et al. |
| 2008/0297346 | A1 | 12/2008 | Brackmann et al. |
| 2009/0007192 | A1 | 1/2009 | Singh |
| 2009/0094425 | A1 | 4/2009 | Winokur |
| 2009/0216969 | A1 | 8/2009 | Winokur |
| 2009/0287967 | A1 | 11/2009 | Winokur |
| 2009/0313503 | A1 | 12/2009 | Atluri et al. |
| 2010/0121824 | A1 | 5/2010 | Kawamura et al. |
| 2010/0169706 | A1 | 7/2010 | Winokur |
| 2010/0172084 | A1 | 7/2010 | Winokur |
| 2011/0131186 | A1 | 6/2011 | Whisenant |
| 2011/0231366 | A1 | 9/2011 | Winokur |
| 2011/0264954 | A1 | 10/2011 | Winokur et al. |
| 2012/0124311 | A1 | 5/2012 | Winokur |
| 2013/0016721 | A1 | 1/2013 | Bill et al. |
| 2013/0019001 | A1 | 1/2013 | Winokur |

FOREIGN PATENT DOCUMENTS

| | | |
|---|---|---|
| JP | H05-233413 | 9/1993 |
| JP | 2004164094 A | 6/2004 |
| JP | 200571068 A | 3/2005 |
| RU | 2128854 C1 | 4/1999 |
| RU | 2221177 C2 | 1/2004 |
| WO | 01/97030 A1 | 12/2001 |
| WO | 2005022292 A2 | 3/2005 |
| WO | 2006111958 A2 | 10/2006 |
| WO | 2008049703 A2 | 5/2008 |
| WO | 2010079447 A1 | 7/2010 |
| WO | 2011015970 A1 | 2/2011 |
| WO | 2011067702 A1 | 9/2011 |

OTHER PUBLICATIONS

U.S. Appl. No. 13/382,926 Office Action dated Jan. 31, 2014.
U.S. Appl. No. 13/382,926 Office Action dated Aug. 12, 2014.
International Application # PCT/IB2014/060689 Search Report dated Jul. 28, 2014.
U.S. Appl. No. 12/647,565 Official Action dated Jan. 23, 2012.
EP Patent Application # 11178916.0 Search Report dated Nov. 10, 2011.
EP Patent Application # 08789728.6 Search Report dated Jan. 16, 2012.

(56) References Cited

OTHER PUBLICATIONS

EP Patent Application # 09750209.0 Search Report dated Jan. 18, 2012.
U.S. Appl. No. 10/585,587 Official Action dated Dec. 7, 2009.
Nadporojski, G., "Review of GSM-telephone Benefon Twin+", published on http://www.ixbt.com, Jan. 9, 2001.
International Application No. PCT/IL2008/001052 Search Report dated Nov. 19, 2008.
Chinese Patent Application No. 200680017546.1 Official Action dated Dec. 26, 2008.
Goldfire Ltd., "Technology and Solutions Developed for Our Clients", Brussels, Belgium, 2009.
Firetrust, "FireTrust Technology", Brussels, Belgium, 2009.
International Application No. PCT/IL2006/000453 Search Report dated Mar. 9, 2007.
Russian Patent Application No. 2007141777 Official Action dated May 6, 2009.
U.S. Appl. No. 12/463,438 Official Action dated Mar. 4, 2011.
EP Application # 11150100.3 Partial Search Report dated Mar. 1, 2011.
EMC Corporation, "EMC SRDF Family: High-Performance remote replication for business continuity", USA (Sep. 6, 2006).
IBM Corporation, "Storage Solutions: Data Encryption within the Drive Itself", USA (Sep. 6, 2006).
U.S. Appl. No. 10/585,587 Official Action dated Aug. 20, 2009.
European Patent Application No. 06728254.1 Supplementary Search Report dated Aug. 19, 2009.
"Flexible Min-K: Product Information", Thermal Ceramics Inc., Jan. 2008.
European Patent Application No. 06728254.1 Official Action dated Sep. 3, 2009.
International Application PCT/IB2009/051919 Search Report dated Oct. 16, 2009.
U.S. Appl. No. 12/721,580 Official Action dated Sep. 28, 2010.
European Patent Application No. 06728254.1 Official Action dated Jan. 22, 2010.
International Application PCT/IB2010/050041 Search Report dated Jun. 8, 2010.
International Application PCT/IB2009/055961 Search Report dated Jun. 24, 2010.
European Patent Application No. 06728254.1 Summons to Attend Oral Proceedings dated Jun. 8, 2010.
Russian Patent Application # 2009126283 Official Action dated Sep. 7, 2010.
U.S. Appl. No. 12/228,315 Official Action dated Sep. 9, 2010.
ANSI/INCITS standard 269-1996, "Information Technology—SCSI-3 Fibre Channel Protocol (FCP)", American National Standards Institute (ANSI) and the International Committee for Information Technology Standards (INCITS), Apr. 8, 1996.
U.S. Appl. No. 12/721,580 Official Action dated Feb. 23, 2011.
International Application PCT/IB2010/053427 Search Report dated Dec. 27, 2010.
U.S. Appl. No. 12/228,315 Official Action dated Feb. 18, 2011.
Russian Patent Application No. 2009126283 Official Action dated Mar. 1, 2011.
Japanese Application # 2008-507263 Official Action dated Jul. 1, 2011.
European Patent Application # 11150100.3 Extended Search Report dated Sep. 26, 2012.
Russian Patent Application # 2011117119 Office Action dated Sep. 10, 2012.
U.S. Appl. No. 13/151,289 Official Action dated Aug. 13, 2012.
U.S. Appl. No. 13/151,289 Office Action dated Jan. 17, 2013.
U.S. Appl. No. 13/132,921 Office Action dated Jun. 20, 2013.
U.S. Appl. No. 13/151,289 Office Action dated Nov. 19, 2013.
U.S. Appl. No. 13/151,289 Office Action dated Sep. 6, 2013.
International Application # PCT/IB2014/065298 Search Report dated Mar. 12, 2015.
U.S. Appl. No. 13/382,926 Office Action dated Jan. 30, 2015.

\* cited by examiner

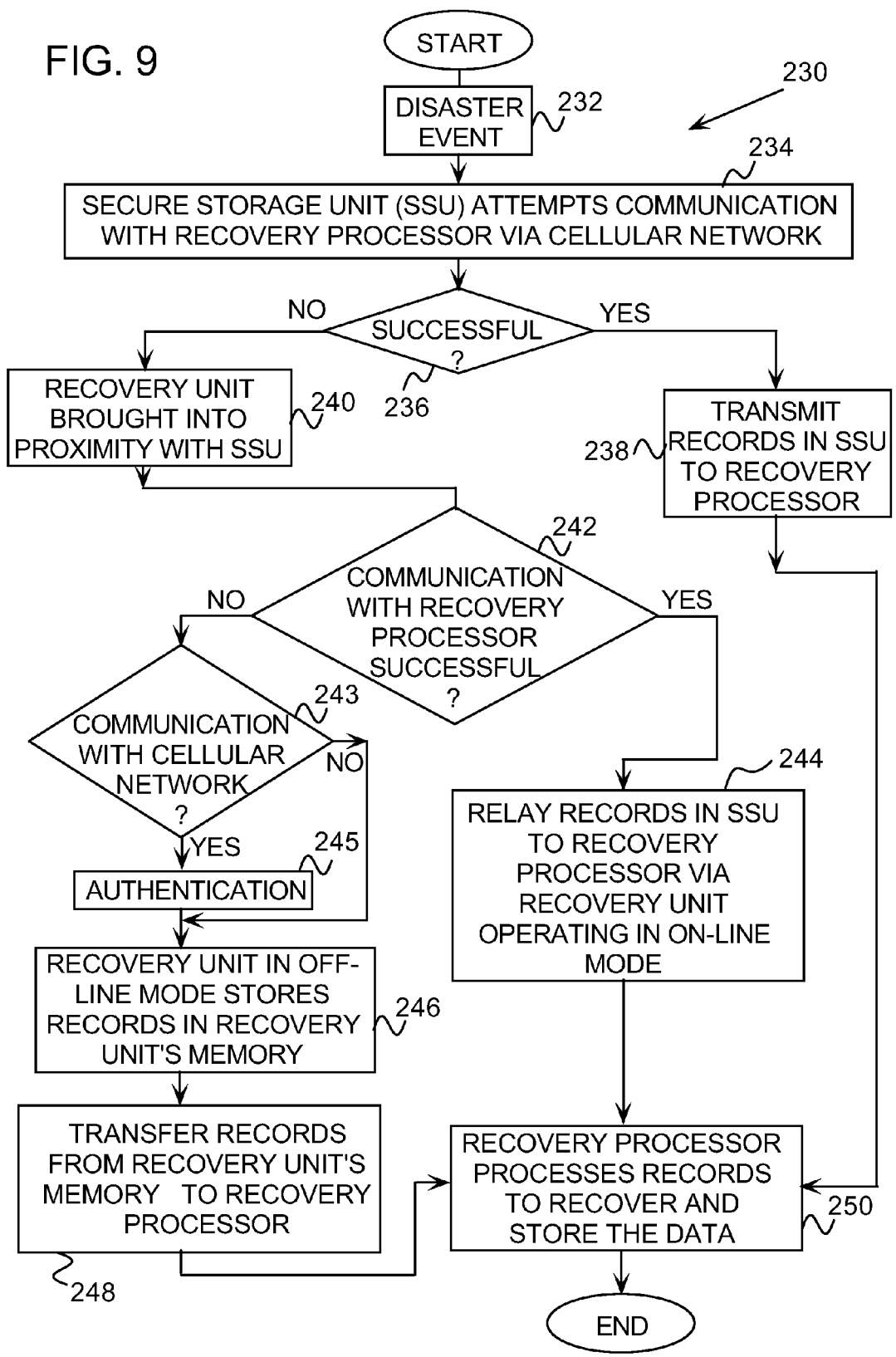

DISASTER-PROOF DATA RECOVERY

CROSS-REFERENCE TO RELATED APPLICATION

This application is a continuation in part of U.S. patent application Ser. No. 13/151,289, filed Jun. 2, 2011, which is a continuation of U.S. patent application Ser. No. 12/721,580, filed Mar. 11, 2010, which is a continuation of U.S. patent application Ser. No. 10/585,587, filed Jul. 10, 2006, now U.S. Pat. No. 7,707,453, which was filed in the U.S. National Phase of PCT Patent Application PCT/IL2006/000453, filed Apr. 10, 2006, which claims the benefit of U.S. Provisional Patent Applications 60/673,664, filed Apr. 20, 2005, and 60/729,112, filed Oct. 20, 2005. This application is also a continuation in part of U.S. patent application Ser. No. 13/132,921, filed Jun. 5, 2011, which was filed in the U.S. National Phase of PCT Patent Application PCT/IB2010/050041, filed Jan. 7, 2010, which claims the benefit of U.S. Provisional Patent Application 61/143,842, filed Jan. 12, 2009. The disclosures of all these related applications are incorporated herein by reference.

FIELD OF THE INVENTION

The present invention relates generally to data protection systems, and particularly to recovering data at the time of or following disaster events.

BACKGROUND OF THE INVENTION

Various methods and systems are known in the art for protecting data in computer systems against disasters such as earthquakes, storms, floods, fires and terrorist attacks. Some solutions involve replicating the data in a primary and in a secondary storage device.

For example, EMC Corporation (Hopkinton, Mass.) offers a family of remote storage replication solutions called Symmetrix Remote Data Facility (SRDF) for disaster recovery and business continuity. The SRDF product family includes both synchronous and asynchronous solutions. Further details regarding the SRDF products are available at www.emc.com/products/networking/srdf.jsp.

As another example, IBM Corporation (Armonk, N.Y.) offers a number of business continuity solutions, including mirroring products. Further details regarding these products are available at www-03.ibm.com/servers/storage/solutions/business_continuity.

The description above is presented as a general overview of related art in this field and should not be construed as an admission that any of the information it contains constitutes prior art against the present patent application.

SUMMARY OF THE INVENTION

An embodiment of the present invention provides a recovery unit for recovering data, including:

an antenna; and a first wireless transceiver, which is configured to communicate via the antenna only with a second wireless transceiver of a storage unit that holds records associated with the data, and, when an event damaging at least some of the data occurs and the recovery unit is brought into proximity with the storage unit, to receive the records from the storage unit for recovery of the data.

Typically, there is also provided a primary storage device wherein a first copy of the data is stored, and a second storage device which is configured to provide an indication of successful storage of the data after a second copy of the data is stored therein. The indication may be provided to the storage unit via the primary storage device.

Typically, the storage unit is configured to delete the records after receipt of an indication of successful storage of the data.

Typically, the storage unit includes a memory having an identification section providing a unique identity for the storage unit. The identification section may include a subscriber identity module. Typically, the first transceiver is configured to only communicate with the second transceiver in response to the second transceiver transmitting the unique identity to the first transceiver.

In a disclosed embodiment the first wireless transceiver is configured to operate in a wireless network, and the recovery unit further includes a satellite terminal which is configured to communicate with the wireless network via a satellite network. The wireless network typically includes one of a cellular network, a WiMax network, and a WiFi network.

The recovery unit may include an operating console which in an on-line mode of operation of the recovery unit is configured to relay the records from the first wireless transceiver to the satellite terminal. The operating console may include a memory, and the operating console in an off-line mode of operation of the recovery unit may be configured to store the records in the memory and not relay the records to the satellite terminal.

The recovery unit may be configured to initially operate in the on-line mode, and to operate in the off-line mode after determining that operation in the on-line mode is unsuccessful. In the off-line mode of operation the first wireless transceiver may be configured to communicate with the second wireless transceiver only after receipt of authentication from the wireless network. In an embodiment, the first wireless transceiver is configured to communicate concurrently with multiple second wireless transceiver of multiple respective storage units.

Typically, there is also provided a recovery processor which is configured to receive the records and in response recover the data and store the recovered data in a non-volatile storage medium.

The first wireless transceiver may include one of a femtocell base station and a picocell base station. Alternatively, the first wireless transceiver may include cellular test equipment that is configured to emulate a cellular base station.

Typically, the second wireless transceiver is configured to communicate only with the first wireless transceiver.

There is further provided, according to an embodiment of the present invention, a method for recovering data, including:

holding records associated with the data in a storage unit including a first wireless transceiver;

when an event damaging at least some of the data occurs, bringing a data record recovery unit including a second wireless transceiver into proximity with the storage unit; and configuring the second wireless transceiver to communicate only with the first wireless transceiver so as to receive the records from the storage unit for the recovery of the data.

There is further provided, according to an embodiment of the present invention, apparatus for recovery of data, including:

a storage unit, including a first wireless transceiver, which is configured to store records associated with the data; and a data record recovery unit, including a second wireless transceiver, which is configured, when an event damaging at least some of the data occurs, to be brought into proximity with the storage unit, and, when in proximity thereto, to communicate via the second wireless transceiver only with the first wireless transceiver so as to retrieve the records from the storage unit for the recovery of the data.

There is further provided, according to an embodiment of the present invention, a method for recovery of data, including:

storing records associated with the data in a storage unit including a first wireless transceiver;

when an event damaging at least some of the data occurs, bringing a data record recovery unit including a second wireless transceiver into proximity with the storage unit; and configuring the second wireless transceiver to communicate only with the first wireless transceiver so as to retrieve the records from the storage unit for the recovery of the data.

There is further provided, according to an embodiment of the present invention, a recovery unit for recovering data, including:

an antenna; and a first wireless transceiver, which is configured to communicate via the antenna only with a second wireless transceiver of a storage unit that holds records associated with the data, and, when an event damaging at least some of the data is simulated and the recovery unit is brought into proximity with the storage unit, to receive the records from the storage unit for recovery of the data.

There is further provided, according to an embodiment of the present invention, a method for recovering data, including:

holding records associated with the data in a storage unit including a first wireless transceiver;

when an event damaging at least some of the data is simulated, bringing a data record recovery unit including a second wireless transceiver into proximity with the storage unit; and configuring the second wireless transceiver to communicate only with the first wireless transceiver so as to receive the records from the storage unit for the recovery of the data.

The present invention will be more fully understood from the following detailed description of the embodiments thereof, taken together with the drawings in which:

BRIEF DESCRIPTION OF THE DRAWINGS

FIG. 9 is a flowchart showing steps to recover data in the system of FIG. 1, according to an embodiment of the present invention.

DETAILED DESCRIPTION OF EMBODIMENTS

Overview

Figure 1:
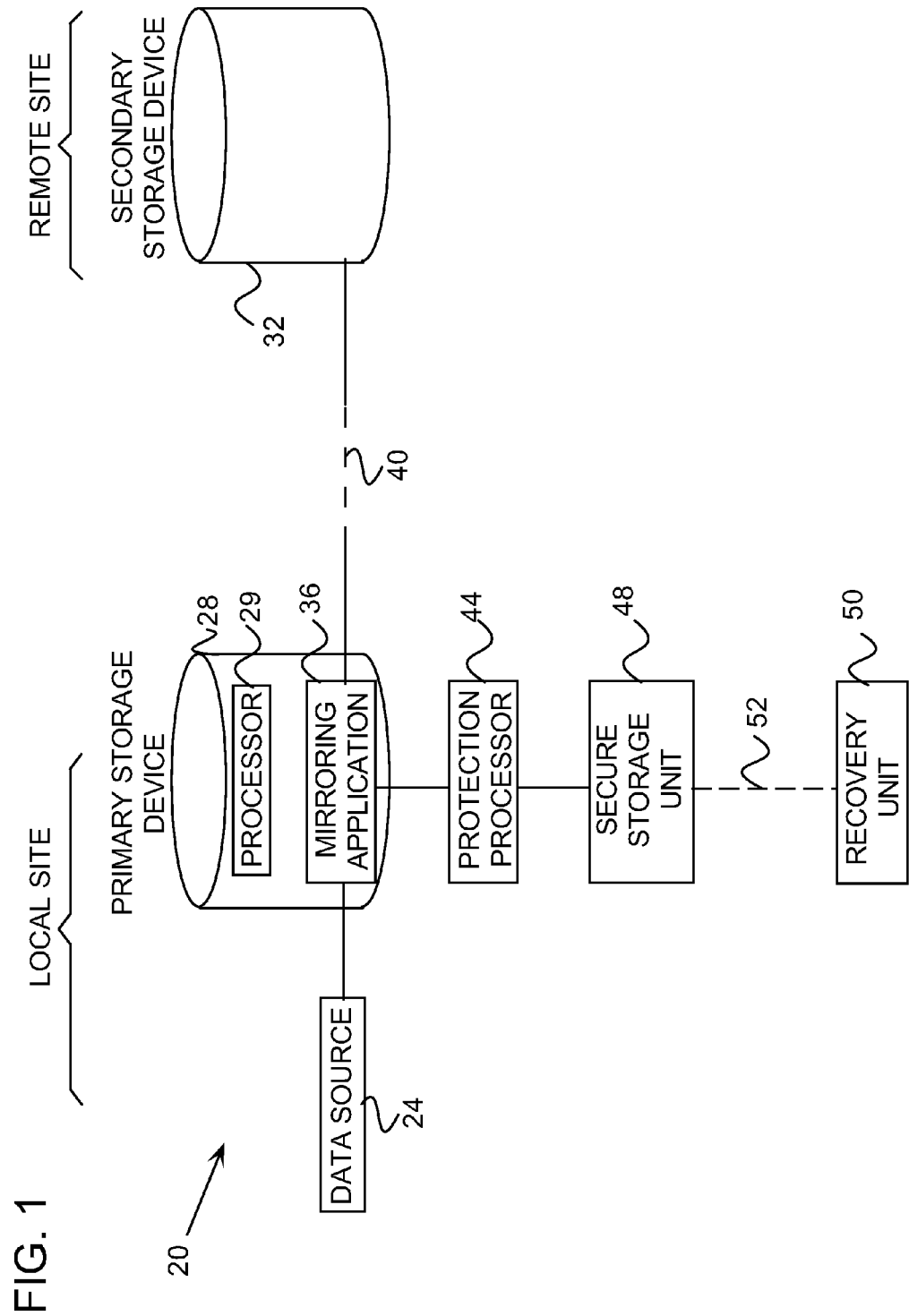
FIG. 1 is a block diagram that schematically illustrates a system for protecting data of an organization against a disaster event, according to an embodiment of the present invention.

Embodiments of the present invention provide a process for recovering data for a data storage system, after a disaster event has affected the system. The disaster event may comprise, for example, a terrorist attack or an earthquake. The data storage system mirrors its data, and records of data being mirrored are stored in a secure storage unit (SSU) of the data storage system. After the disaster event the secure storage unit retains the records (which are typically of data that has not been correctly mirrored) in an SSU memory.

The SSU comprises a first transceiver which is configured to convey the data records to a recovery processor. The processor recovers the data from the data records, and stores the recovered data.

After the disaster event, the SSU is able to convey the data records to the recovery processor by four different distinct routing methods.

In the first routing method, the SSU successfully opens, using a unique identity assigned to the SSU, a wireless communication channel of a wireless network which is connected to the recovery processor. The data records are transferred to the processor via the channel.

In the second, third, and fourth routing methods, one of which is typically implemented if the first method cannot transfer the records, a recovery unit is brought into proximity with the SSU. The recovery unit comprises a second transceiver, typically a picocell or a femtocell base station, which is configured to only open a wireless communication channel with a transceiver having the unique identity of the SSU.

The recovery unit also comprises a satellite terminal, which is configured to connect to the wireless network via a satellite network. A console, such as a laptop computer, acts to relay data records (from the SSU) from the second transceiver to the satellite terminal.

In the second routing method, the terminal transfers the records to the recovery processor via the satellite and wireless networks.

The third routing method typically operates if the second method cannot transfer the records. In the third routing method, as for the second routing method, the second transceiver opens a wireless communication channel with the SSU transceiver, utilizing the unique identity of the SSU, and receiving authentication from the wireless network via the satellite terminal. However, in the third method, the satellite terminal has limited bandwidth connection to the wireless network, so that the records cannot be transferred to the recovery processor. In this case, the data records transfer via the communication channel to the recovery unit, which stores the records in a memory of the recovery unit.

The fourth routing method typically operates if the third method cannot transfer the records. The fourth method is generally similar to the third method, except that in the fourth method the satellite terminal is unable to connect at all to the wireless network. In the fourth method the wireless channel between the second transceiver and the SSU is opened without receiving authentication from the wireless network.

Rather, the authentication is simulated. As for the third method, in the fourth method the data records are stored in the memory of the recovery unit.

In both the third and fourth methods, the recovery unit is then transferred to a location where it is able to connect to the recovery processor, and the processor retrieves the records from the recovery unit's memory.

By having four distinct routing methods for transferring data records from the SSU, and by having three of those systems using a communication channel that is only available to the SSU, embodiments of the present invention ensure a high probability of successfully recovering the data represented by the data records stored in the SSU.

DETAILED DESCRIPTION

FIG. 1 is a block diagram that schematically illustrates a system 20 for protecting data of an organization against a disaster event, according to an embodiment of the present invention. Disaster events may comprise any event that affects the organization, and in particular the data storage of the organization. A disaster event may comprise, for example, an earthquake, a storm, a fire, a flood or a terrorist attack. In some cases, a system failure, such as a computer system failure or a power outage that affects the data storage of the organization, can also be regarded as a disaster event.

Different organizations have different data types that should be protected in the event of a disaster. For example, an information technology (IT) system may use and/or produce data that is valuable to the organization. Additionally or alternatively, data produced by various systems in the organization can be valuable for investigating the disaster event. For example, the source, destination and/or contents of telephone conversations held immediately before or during the disaster may prove valuable. As another example, information gathered from security and surveillance systems before and during a terrorist attack, such as video images and data acquired by access control systems may also be considered valuable.

System 20 stores data produced and/or used by a data source 24. In order to protect the data, system 20 mirrors (i.e., replicates) the data and stores it in two or more storage devices. In some embodiments, system 20 comprises a primary storage device 28 and a secondary storage device 32. The two storage devices hold replicas of the organization data, in a configuration commonly known as a mirrored configuration. Storage devices 28 and 32 may comprise disks, magnetic tapes, computer memory devices, and/or devices based on any other suitable storage technology. In some embodiments, the storage devices comprise internal processors that perform local data storage and retrieval-related functions, and by way of example, primary storage device is assumed to comprise an internal processor 29. Although the description that follows refers to two storage devices, other implementations of system 20 may comprise a higher number of storage devices. In some embodiments, system 20 may be implemented using only a single storage device, for example for protecting the data acquired from security systems immediately before a terrorist attack. Those having ordinary skill in the art will be able to adapt the following description for systems having numbers of storage devices other than two.

Typically, the primary and secondary storage devices are physically located at two separate sites. The sites are chosen to be sufficiently distant from one another, so that a disaster event in one of the sites will be unlikely to affect the other. In some embodiments, regulatory restrictions recommend a separation greater than 200 miles, although any other suitable distance can also be used. In the example of FIG. 1, primary storage device 28 is collocated with the data source at a local site, and secondary storage device 32 is located at a remote site. The two storage devices are connected by a communication link 40 which enables data transfer between the devices.

A mirroring application 36 performs mirroring of the data, i.e., stores replicas of the data produced by data source 24 in the primary and the secondary storage devices. Typically, the mirroring application accepts write commands from data source 24, the commands comprising or pointing to data to be stored. The mirroring application stores the data in the primary and secondary storage devices. In the exemplary embodiment of FIG. 1, the mirroring application runs on processor 29 of the primary storage device. Alternatively, application 36 may run on a separate processor. In order to ensure that no data is lost until it is safely stored in the secondary storage device as well, as well as storing the data in the secondary device, the mirroring application sends a record of the data, typically via a protection processor 44 (having functions described below), for temporary storage in a data record secure storage unit (SSU) 48. SSU 48 is constructed in a durable manner so as to be disaster-proof, i.e., to be robust enough to have a high probability of surviving the disaster events described herein while protecting its cached data records.

PCT application PCT/IL2006/000453, which is incorporated herein by reference, describes further aspects and applications of data storage and mirroring using disaster-proof storage units.

In the exemplary system configuration of FIG. 1, processor 44 emulates an additional storage device connected to a port of mirroring application 36.

Processor 44 communicates with application 36 using a suitable communication link, such as an optical fiber link, an Internet Protocol (IP) link or a bus such as a peripheral component interconnect (PCI) bus. In order to enable small transaction latency, processor 44 is typically located adjacent to the mirroring application. The mirroring application is typically configured to forward every write command it accepts, as well as any acknowledgments it receives, to processor 44. Processor 44 may communicate with application 36 using any suitable protocol, such as the small computer systems interface (SCSI), network file system (NFS) and common internet file system (CIFS) protocols, which are commonly used for communication between servers and storage devices.

Typically, processor 44 comprises a general-purpose computer, which is programmed in software to carry out the functions described herein. In some embodiments, processor 44 may be implemented internally to the primary storage device.

Processor 44 is connected to SSU 48. Typically, for every write operation sent or to be sent via link 40 to secondary storage device 32, processor 44 stores a respective record in unit 48. The record is cached in unit 48 until an acknowledgement indicating successful storage is received via link 40 from device 32. Once an acknowledgement of a particular write command is received from the secondary storage device, processor 44 deletes the corresponding record from unit 48. Processor 44 may communicate with unit 48 using any suitable interface, such as a universal serial bus (USB) interface. In some embodiments, unit 48 is mapped as a virtual storage drive of processor 44. In some embodiments, the communication interface also provides electrical power for powering the secure storage unit.

After a disaster event hits the primary site, a data record recovery unit 50 may be brought into proximity with unit 48, which is assumed to remain at the primary site. A broken line 52 in FIG. 1 illustrates that the recovery unit may be brought into proximity with unit 48 after the disaster event. As is explained in more detail below, recovery unit 50 and SSU 48 are configured to communicate by wireless directly with each other. The direct communication may use a cellular protocol, a WiMax protocol, a WiFi protocol, or any other suitable wireless protocol, including a custom-designed communication protocol, that permits data transfer in a respective wireless network. For simplicity, in the following description, the communication is assumed to use a specific cellular protocol, and this protocol is assumed to be operative in a specific cellular network. The cellular protocol and network are also referred to herein as the designated cellular protocol and the designated cellular network. Those having ordinary skill in the art will be able to adapt the description, mutatis mutandis, for communication via another protocol.

The direct wireless communication allows recovery unit 50 to retrieve the records stored in SSU 48, even if communication via a wireless network operating the designated cellular protocol is not available to the secure storage unit. Using the records, the data that may have been lost due to the disaster event may be reconstructed.

Figure 2:
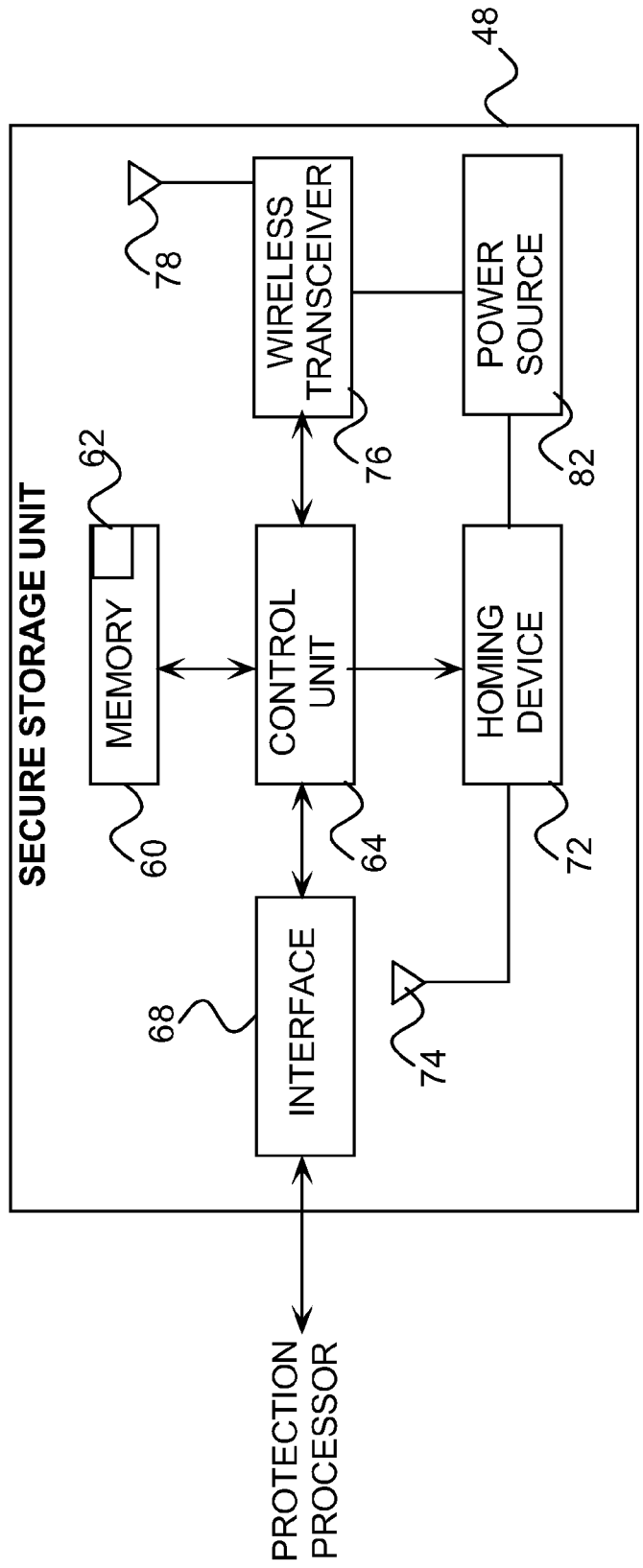
FIG. 2 is a block diagram that schematically illustrates a data record secure storage unit, according to an embodiment of the present invention.

FIG. 2 is a block diagram that schematically illustrates data record secure storage unit 48, according to an embodiment of the present invention. Unit 48 comprises a memory 60, which holds records corresponding to write commands, the records having been transferred via protection processor 44. Memory 60 may comprise, for example, a non-volatile memory device such as a flash device or an electrically erasable programmable read only memory (EEPROM) device. Alternatively, memory 60 may comprise any other suitable non-volatile or battery-backed memory device. Memory 60 may comprise one or more memory devices.

Memory 60 comprises an identification section 62, which provides a unique identity for unit 48 during communications made by the unit. In some embodiments, section 62 may comprise a subscriber identity module (SIM).

Unit 48 comprises a control unit 64, which performs the various data storage and management functions of SSU 48, including accessing section 62 to provide the unique identity of unit 48 during communications with recovery unit 50. Control unit 64 may comprise a computing device such as a microprocessor running suitable software. Alternatively, control unit 64 may be implemented in hardware, or may use a combination of hardware and software elements. An interface circuit 68, such as a USB interface circuit, handles the physical interface between unit 48 and protection processor 44 (FIG. 1). In embodiments in which supply voltage is provided to unit 48 from protection processor 44, circuit 68 provides this voltage to the various elements of unit 48.

Control unit 64 operates a detection mechanism that detects disaster events. For example, the detection mechanism may detect an absence of electrical power and/or a problem in communication with processor 44, and/or a fault in link 40, and conclude that a disaster event has occurred. Typically, on detecting a disaster event, the control unit is configured to attempt to provide alarms to the local and remote sites, as well as to an operator of system 20.

In some embodiments, unit 48 comprises a homing device 72, coupled to a homing antenna 74. Homing device 72 comprises a transmitter or transponder, which transmits a radio frequency (RF) homing signal in order to enable unit 48 to be located following a disaster event. Typically, homing device 72 begins to operate when unit 48 detects that a disaster event occurred, and as a result the unit activates the homing device. Device 72 may comprise an active, passive or semi-active homing device.

In some embodiments, homing device 72 is powered by a power source 82. Power source 82 may comprise a rechargeable battery, which is charged by electrical power provided via interface 68 during normal system operation. Alternatively, power source 82 may comprise any other suitable battery. In some embodiments, power source 82 is used to power control unit 64 and/or memory 60.

Unit 48 comprises a wireless transceiver 76 coupled to a communication antenna 78. Transceiver 76 is typically powered by power source 82. The transceiver, under direction from control unit 64 which uses the unique identity from identification section 62, is configured to operate under the designated network protocol, so that when the transceiver is operative, secure storage unit 48 may effectively appear as a transceiver operative in the designated network.

Typically, control unit 64 powers transceiver 76 on when the control unit detects a disaster event. In some embodiments, transceiver 76 may be configured to power on at preselected times, for example, once every six hours, so that its operation may be checked. In an alternative embodiment, transceiver 76 is used in place of homing device 72, and the transmissions from the transceiver are used as homing signals.

Typically, the communication between unit 48 and processor 44 is broken due to the disaster event, so that no further data records are stored in or deleted from memory 60. The control unit then operates the transceiver to transmit the records stored in memory 60 to recovery unit 50.

Figure 3:
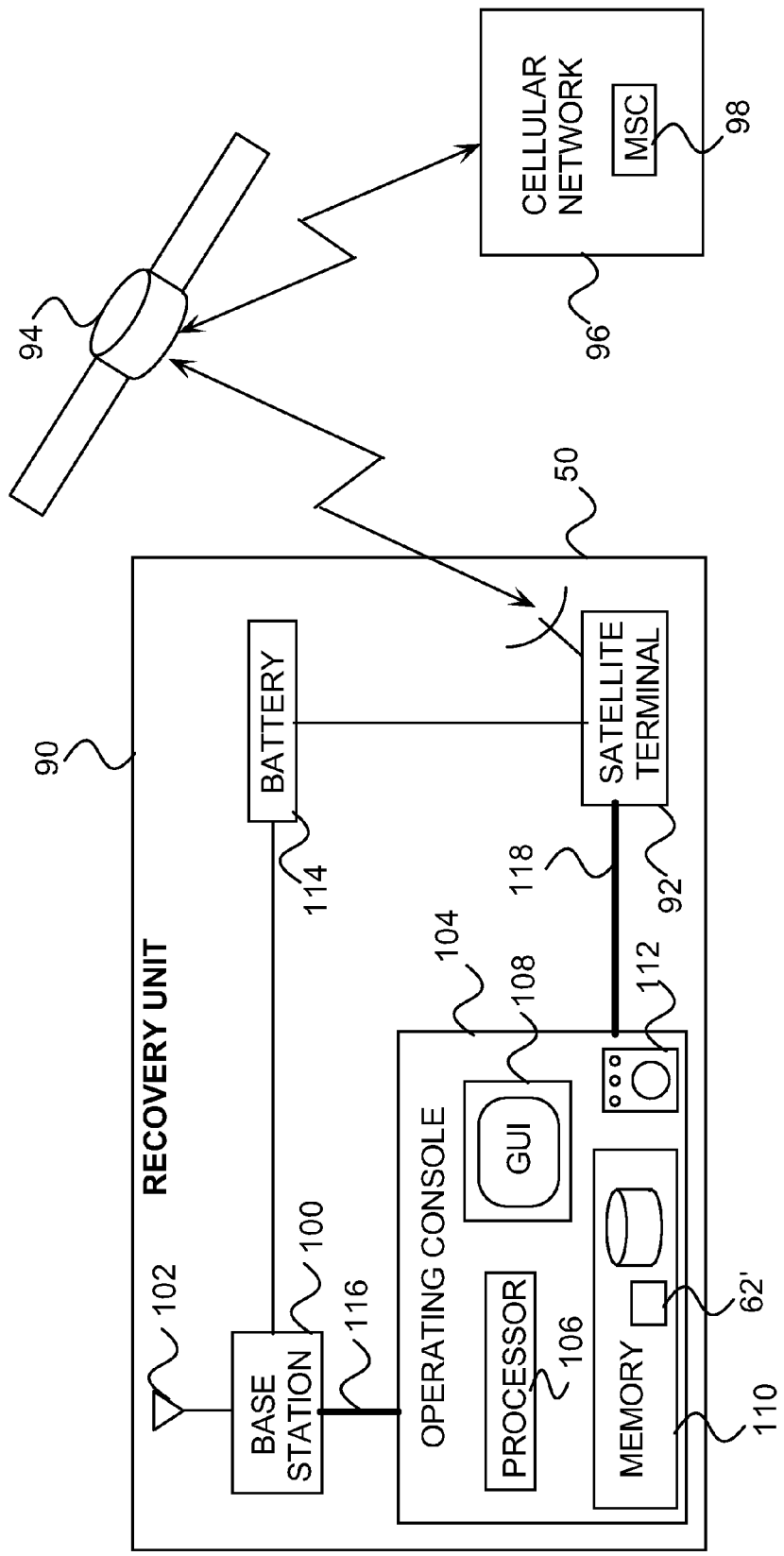
FIG. 3 is a schematic block diagram of a data record recovery unit, according to an embodiment of the present invention.

FIG. 3 is a schematic block diagram of data record recovery unit 50, according to an embodiment of the present invention. Unit 50 is implemented to be transportable by an operator of the unit, so that in the circumstance of a disaster event the operator may bring the unit into proximity with secure storage unit 48. Typically, recovery unit 50 is packaged in a casing 90 having the dimensions of a midsize suitcase.

A satellite terminal 92 in unit 50 is configured to be able to connect via a satellite network 94 to a cellular network 96, herein assumed to comprise the designated cellular network. The designated cellular network comprises a mobile switching center (MSC) 98, which, inter alia, is responsible for authentication and channel allocation of cellular transceivers operative in the network. Terminal 92 is typically implemented as a small volume device, similar in size to a satellite terminal such as the Explorer 110 provided by Inmarsat plc of London, England. Satellite network 94 is herein assumed, by way of example, to comprise the Inmarsat satellite network.

Unit 50 comprises a base transceiver station (BTS) 100, typically a picocell or a femtocell BTS, which is configured to operate under the designated cellular protocol. BTS 100 uses an antenna 102 for transmitting and receiving its wireless cellular signals. Antenna 102 may be incorporated within casing 90, or may be external to the casing.

As is known in the art, picocell and femtocell BTSs have a small volume, so that base station 100 typically has dimensions of the order of 200 mm×200 mm×50 mm.

Femtocell and picocell base stations known in the art are configured to allow a small number of cellular transceivers access to the station at any one time. Typically the number is in the range of two-four for a femtocell. In contrast to the femtocell and picocell base stations known in the art, base station 100 is configured to only allow access from a cellular transceiver having the unique identity of SSU 48, i.e., the identity that is in memory identification section 62 of the secure storage unit, and to deny access to any other cellular transceiver. The denial of access applies to other transceivers operating under the designated cellular protocol, as well as to transceivers operating under different protocols. In some embodiments, in a substantially similar manner to that implemented for base station 100, SSU 48 is configured to only be able to communicate with base station 100.

In some embodiments, base station 100 and antenna 102 are configured to receive the homing signal generated by device 72 of the secure storage unit (FIG. 2). Alternatively, recovery unit 50 comprises another receiver (not shown in FIG. 3) that is configured to receive the homing signal. The homing signal is typically transferred to an operating console 104 of the recovery unit.

Operating console 104 of the recovery unit is a computing device that may typically comprise a laptop computer, or another computing device such as a portable digital assistant (PDA). Console 104 comprises a processing unit 106, a graphic unit interface 108, and a user input device 112. Console 104 also comprises a memory 110 which typically includes volatile and non-volatile sections. Memory 110 incorporates a copy 62' of memory identification section 62 (FIG. 2), as well as software used by processing unit 106. The elements of console 104, together with software installed in the memory, enable operation of the recovery unit. Other functions of console 104 are described below.

A battery 114, typically a rechargeable battery, supplies power to the base station and to the satellite terminal. In some embodiments the battery is configured to power operating console 104. Battery 114 is typically selected to be able to power all components connected to the battery for at least 6 hours.

A communication channel 116, typically implemented as a connecting cable, between the operating console and the base station, enables data transfer between the console and the base station. A communication channel 118, also typically implemented as a connecting cable, between the operating console and the satellite terminal, enables data transfer between the console and the terminal. Communication channels 116 and 118 may use any suitable method for data transfer, such as USB busses.

BTSs, including picocell and femtocell BTSs, known in the art are typically controlled by a parent base station controller (BSC) via a base station control function (BCF). The BTS connects to its BSC by an Abis interface. The BCF provides an operations and maintenance connection to a network management system (NMS) which comprises an MSC. In order to transfer data from a calling transceiver to a receiving transceiver, the calling transceiver receives authentication and broadcast channel information, transmitted via the Abis interface, from the MSC. Once the calling transceiver has received its authentication and channel information, it is then able to select and use a broadcast channel to transfer its data.

In contrast to the BTSs known in the art, base station 100 is not controlled by, or connected to, a BSC, and the base station may not use an Abis interface. Rather, the broadcast channel information and the authentication that base station 100 needs to transmit to its calling transceiver, in this case transceiver 76 of the secure storage unit (FIG. 2), is provided from operating console 104. As is explained in more detail below, the broadcast channel information and authentication may be derived either if the recovery unit is operative in an on-line mode, or alternatively if the unit is operative in an off-line mode.

Operating console 104 derives the broadcast channel information and the authentication required for transceiver 76 by communicating via satellite terminal 92 with MSC 98. The console uses identification section 62' to forward corresponding identity information to MSC 98, which returns the broadcast channel information and the authentication to the console. The console typically stores the channel information and the authentication in memory 110.

As described above, operating console 104 may be configured to receive the homing signal from homing device 72. Alternatively, as stated above, the transmission from transceiver 76 may be used as a homing signal. In either case, the console may also be configured to use the signal to present on GUI 108 an aid to an operator of the recovery unit in locating SSU 48.

Figure 4:
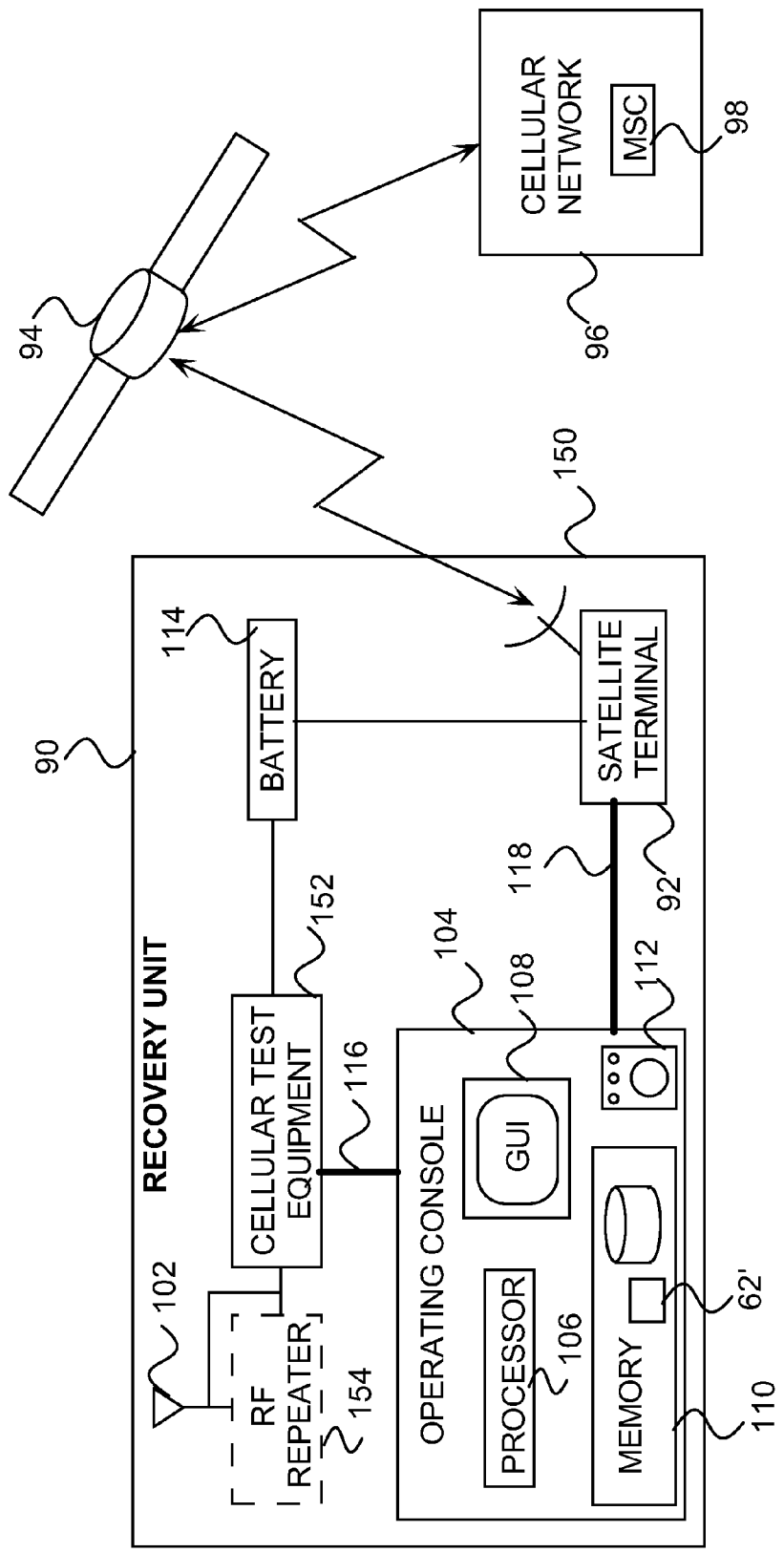
FIG. 4 is a schematic block diagram of an alternative recovery unit, according to an alternative embodiment of the present invention.

FIG. 4 is a schematic block diagram of an alternative recovery unit 150, according to an alternative embodiment of the present invention. Apart from the differences described below, the operation of recovery unit 150 is generally similar to that of recovery unit 50 (FIG. 3), and elements indicated by the same reference numerals in both recovery units 50 and 150 are generally similar in construction and in operation.

In place of base station 100, recovery unit 150 comprises cellular testing equipment 152, which is configured to emulate the functions of base station 100. In one embodiment equipment 152 comprises an R&S® CMU200 Universal Radio Communication Tester, produced by Rohde and Schwartz of Munich, Germany. In emulating base station 100, equipment 152 communicates with console 104 via communication channel 116, and receives and transmits its signals via antenna 102, substantially as described above for base station 100. In some embodiments, unit 150 comprises a radio-frequency (RF) wireless repeater 154, which is configured to operate at the receiving frequency of the cellular signals, and to amplify the received signals to a level suitable for reception by equipment 152. In one embodiment, RF repeater 154 comprises a WCDMA Repeater produced by Quanzhou Xiegao Microwave Electronic Co., Ltd, of Quanzhou, Fujian, China, although any other suitable RF repeater may be used.

Embodiments of the present invention may use a recovery unit similar to unit 50 or to unit 150. For simplicity, the description herein assumes that recovery unit 50 is used, and those having ordinary skill in the art will be able to adapt the description, mutatis mutandis, for use of unit 150.

Figure 5:
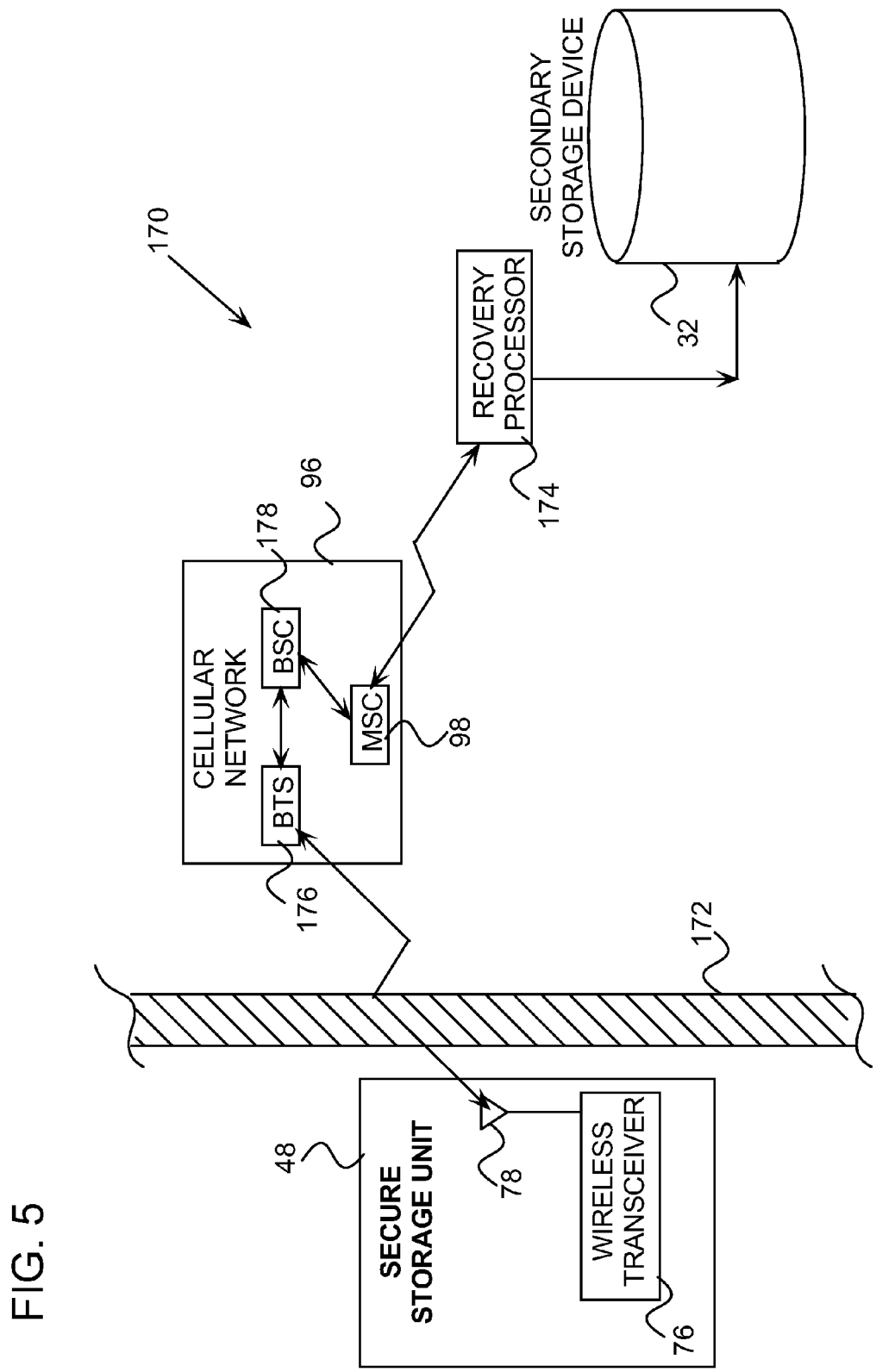
FIG. 5 is a diagram illustrating a first routing method for data recovery from the secure storage unit, according to an embodiment of the present invention.
Figure 6:
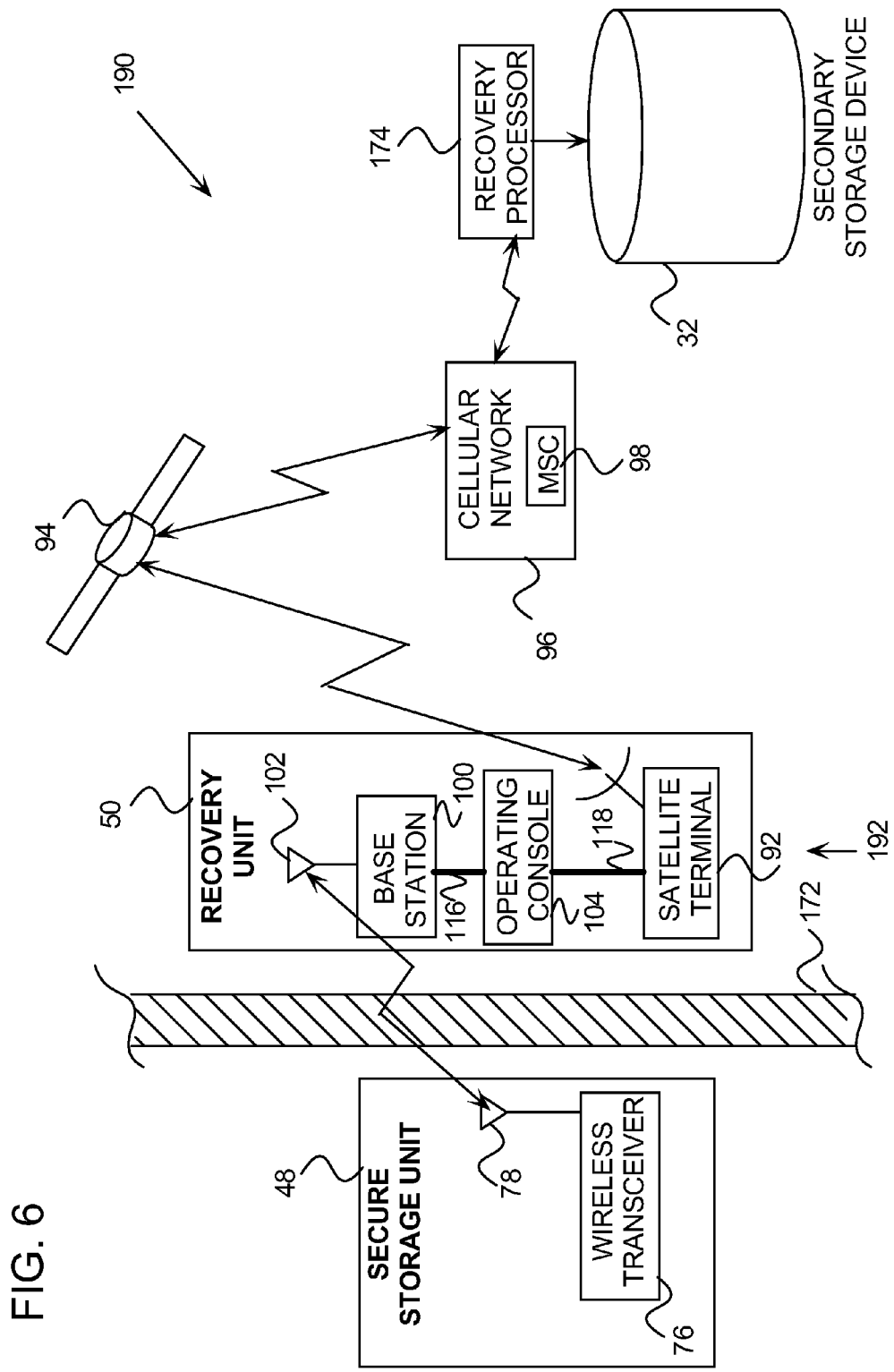
FIG. 6 is a diagram illustrating a second routing method for data recovery from the secure storage unit, according to an embodiment of the present invention.
Figure 7:
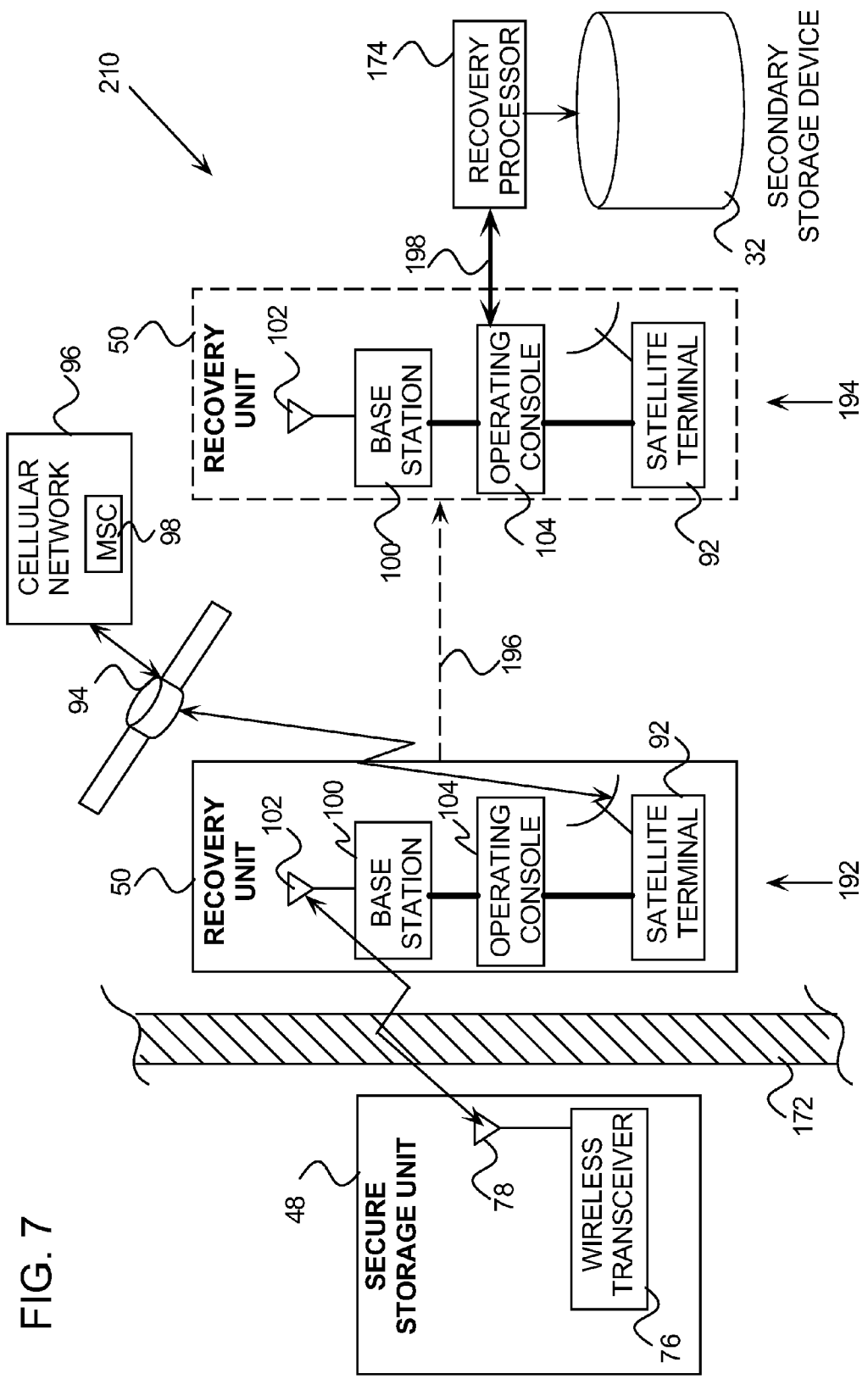
FIG. 7 is a diagram illustrating a third routing method for data recovery from the unit, according to an embodiment of the present invention.
Figure 8:
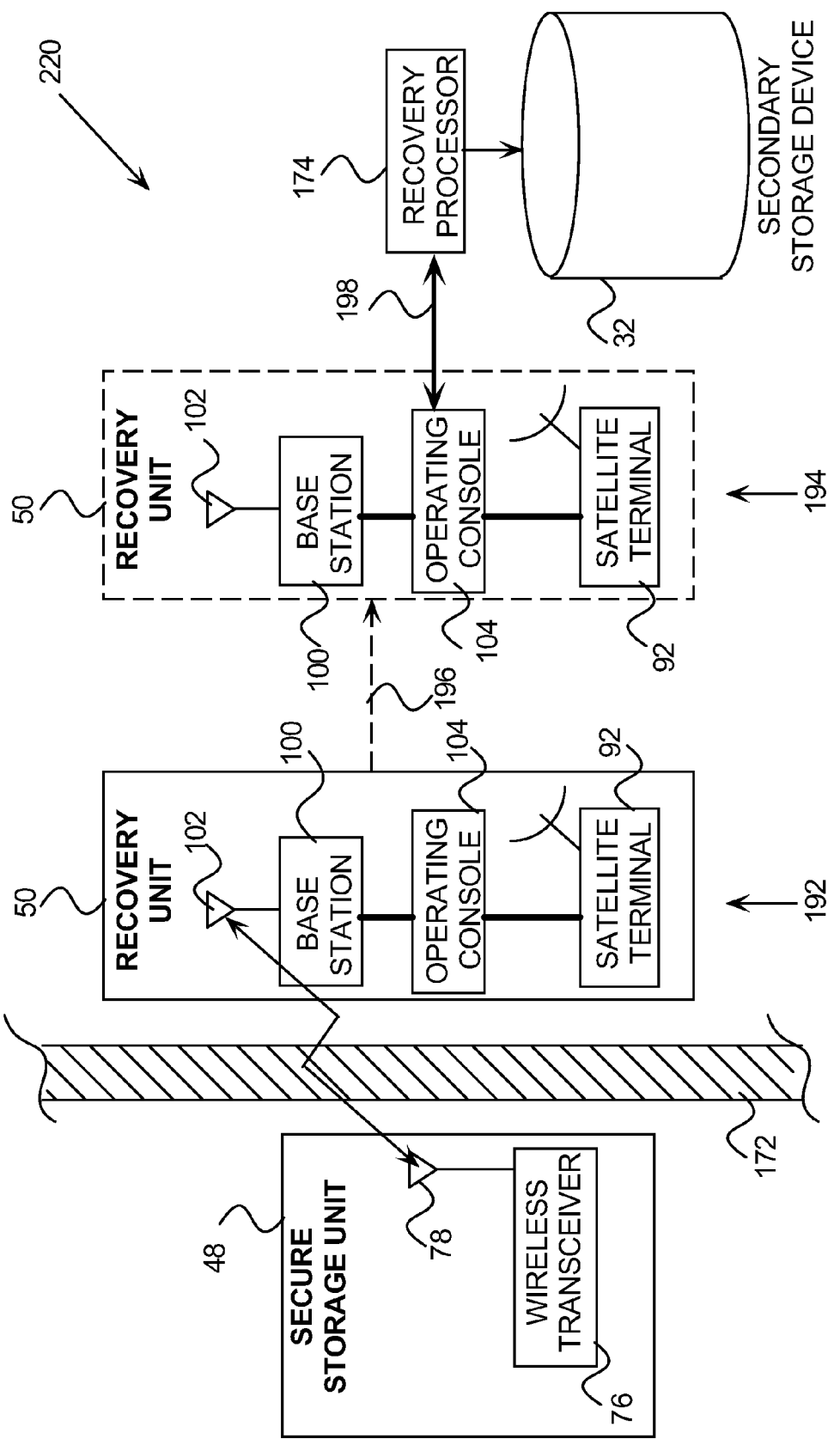
FIG. 8 is a diagram illustrating a fourth routing method for data recovery from the unit, according to an embodiment of the present invention.

FIG. 5 is a diagram illustrating a first routing method 170 for data recovery from secure storage unit 48, FIG. 6 is a diagram illustrating a second routing method 190 for data recovery from the unit, FIG. 7 is a diagram illustrating a third routing method 210 for data recovery from the unit, and FIG. 8 is a diagram illustrating a fourth routing method 220, according to respective embodiments of the present invention. For simplicity, in the diagrams only some of the elements of SSU 48 and of recovery unit 50 are shown.

The four routing methods are assumed to be implemented after control unit 64 has detected a disaster event, or as is explained below, such an event is deemed to have occurred. After the disaster event, SSU 48 is assumed to be inaccessible, by way of example behind a wall 172, so that no physical connection is possible with the secure storage unit. In one embodiment, and as described with reference to the flowchart of FIG. 9 below, the four routing methods are implemented sequentially.

On detection of a disaster event, control unit 64 activates transceiver 76 to transmit the unique identity (corresponding to identification section 62 of SSU 48) according to the designated cellular protocol. The object of activating the transceiver is so that a communication channel between a recovery processor 174 and the transceiver is set up. Recovery processor 174 is configured to retrieve the data records stored in memory 60 of the secure storage unit via the communication channel. Once it has retrieved the data records, the recovery processor is configured to recover the data represented by the records, and restore it to any suitable non-volatile data storage medium. By way of example, the non-volatile data storage medium is herein assumed to comprise secondary storage device 32.

In routing method 170 (FIG. 5) the transmission from transceiver 76 is received by a BTS 176 operative in designated cellular network 96. BTS 176 communicates via an Abis interface with a BSC 178, the controlling BSC of BTS 176. BSC 178 in turn communicates with MSC 98 of the network. MSC 98 authenticates transceiver 76, and conveys the authentication and broadcast channel information to the transceiver. The transceiver then opens a communication channel to recovery processor 174.

Processor 174 retrieves the data records stored in memory 60 using the communication channel (the records may or may not represent data that has been successfully stored on secondary storage device 32). The recovery processor then processes the records to recover the data the records represent, and stores the recovered data on device 32.

Routing method 190 (FIG. 6) is typically operative when a disaster event has been detected, but routing method 170 is not operative. Routing method 190 is assumed to comprise a situation wherein cellar network 96 is still operative, but wherein no BST is able to communicate with transceiver 76, or wherein any communication established has a bandwidth below a predetermined acceptable threshold. Routing method 190 corresponds to recovery unit 50 operating in an on-line mode, wherein full communication between the unit and recovery processor 174 is possible.

In routing method 190, recovery unit 50 is brought into a location 192 that is in close enough proximity to secure storage unit 48 so that the transmissions from transceiver 76 comprising its unique identity can be received by base station 100. Positioning of the recovery unit in location 192 may be facilitated by the unit using the homing signal transmitted from SSU 48, as described above.

Base station 100 transfers the unique identity of transceiver 76 to console 104, which relays the unique identity to satellite terminal 92. Terminal 92 establishes a first communication channel with MSC 98 via satellite network 94, and uses the channel to transfer the unique identity to the MSC. In response, MSC 98 generates authentication and broadcast channel information which is transferred via network 94 and terminal 92 to console 104, and from console 104 via base station 100 to transceiver 76. Thus, console 104 acts as a relay for the authentication and broadcast channel information.

The transceiver then opens a second communication channel to recovery processor 174 via base station 100, console 104 (again acting as a relay), terminal 92, satellite network 94 and cellular network 96. As for routing method 170, recovery processor 174 retrieves the data records stored in memory 60 using the second communication channel, processes the records to recover the data the records represent, and stores the recovered data on device 32.

Routing method 210 (FIG. 7) is typically operative when a disaster event has been detected, but neither method 170 nor method 190 is operative. Routing method 210 is assumed to comprise a situation wherein terminal 92 has only limited accessibility and/or a low bandwidth of communication with cellar network 96. Such a limited communication ability may occur, for example, if the antenna of terminal 92 is small, or does not have open access to a satellite of network 94. Routing method 210 corresponds to recovery unit 50 operating in an off-line mode. Typically, as described in more detail below, recovery unit 50 first attempts operation in its on-line mode (method 190), and if this mode is not operative, reverts to the off-line mode of method 210.

As for routing method 190, in routing method 210 recovery unit 50 is in location 192, so that the transmissions from transceiver 76 comprising its unique identity can be received by base station 100, and the unique identity may be conveyed to console 104. In method 210, the limited communication ability is assumed to allow the transfer of authentication and broadcast channel information from MSC 98, but not the transfer of the data records stored in the SSU. After opening a broadcast channel between base station 100 and transceiver 76, console 104 uses the channel to retrieve the data records stored in memory 60 of the secure storage unit. Console 104 stores the data records in memory 110 of the recovery unit.

Except as described below, routing method 220 (FIG. 8) is generally similar to routing method 210. Routing method 220 is also an off-line mode, and may be implemented when recovery unit 50 is in location 192. Routing method 220 is typically operative when a disaster event has been detected, but none of methods 170, 190, nor 210 is operative. Routing method 220 is assumed to comprise a situation wherein terminal 92 has no access to cellar network 96.

Because there is no communication with cellular network 96 or MSC 98, console 104 does not transfer the unique identity of transceiver 76 to terminal 92. Rather, console 104 transmits authentication and broadcast channel information, that would (given communication with cellular network 96) have been provided by MSC 98, from its memory 110 (FIG. 4) to transceiver 76. Console 104 may have obtained the authentication and broadcast channel information prior to the disaster event, and stored it in memory 110. Alternatively, processor 106 of the operating console may be configured to generate and store in memory 110 alternative authentication and broadcast channel information, and in this case the console transmits the alternative authentication and channel information, using the designated network protocol, to transceiver 76.

Transceiver 76 uses the information, or the alternative information, to establish a wireless communication channel with base station 100. Since transceiver 76 and base station 100 are isolated from cellular network 96, the communication channel is also isolated from the network, and so there is no possibility of conflict with network 96 operation. Thus, if console 104 uses alternative authentication and broadcast channel information, the information may be generated on a purely theoretical basis, and may not be operative in network 96.

In both method 210 and 220 console 104 uses the communication channel between base station 100 and transceiver 76 to retrieve the data records stored in memory 60 of the secure storage unit. Console 104 stores the data records in memory 110 of the recovery unit.

Also in methods 210 and 220, in order to recover the data corresponding to the records, recovery unit 50 is moved from location 192 to a different location 194. The move is illustrated in FIG. 7 and FIG. 8 by a dashed arrow 196, and by encasing recovery unit 50 in location 194 in a dashed rectangle. Typically location 194 is selected so that the recovery unit is able to open a communication channel with good transmission characteristics with recovery processor 174, without the location necessarily being physically close to the processor. In some embodiments location 194 is physically close to the processor, in which case the recovery processor may be connected, typically by a communication cable 198 such as a USB connection, to console 104, to form a communication channel between the console and the processor. The recovery processor uses the channel to access the data records stored in memory 110 of the recovery unit. The recovery processor then processes the records to recover the data they represent, and stores the recovered data on storage device 32.

FIG. 9 is a flowchart 230 showing steps to recover data in system 20, according to an embodiment of the present invention. In a first step 232, a disaster event for system 20 occurs. Typically, the disaster event is detected by control unit 64, as described above with reference to FIG. 2. Alternatively the disaster event may be detected by another element of system 20, typically by the element detecting a malfunction in system 20.

In an initial communication step 234, secure storage unit 48 attempts wireless communication with recovery processor 174, via cellular network 96, by activating transceiver 76.

In a first decision 236, if the communication of step 234 is successful, in a transmission step 238 data records stored in memory 60 of the secure storage unit are transmitted to recovery processor 174. The operations of steps 234 and 238 are described in more detail above, with reference to routing method 170 (FIG. 5).

If the communication checked by decision 236 is not successful, the flowchart proceeds to a recovery unit step 240. In step 240, recovery unit 50 is moved into location 192 (FIGS. 6, 7 and 8), that is close enough in proximity to SSU 48 so that base station 100 is able to receive transmissions from transceiver 76. The movement into location 192 may be facilitated by console 104 detecting homing signals from homing device 72 (activated by control unit 64) or from transceiver 76, as described above.

In a second decision 242, recovery unit 50 attempts to establish communication with recovery processor 174 via satellite network 94. If communication is successfully established, the flowchart proceeds to a record transfer step 244, wherein the data records in SSU 48 are transferred to recovery processor 174 via the recovery unit operating in its on-line mode. The successful establishment of communication in decision 242, and the functions performed in step 244, are described in more detail above for routing method 190 (FIG. 6).

If in decision 242 the recovery unit is unable to establish communication with recovery processor 174 via satellite network 94, the flowchart transfers to a third decision 243. Decision 243 checks if there is limited communication with cellular network 96. If there is, then in an authentication step 245, MSC 98 conveys authentication and broadcast channel information (for transfer of data records from the SSU) to the recovery unit. The flowchart then continues to a first off-line step 246.

If decision 243 returns that there is no communication with cellular network, the flowchart continues directly to step 246.

In first off-line step 246 the recovery unit operates in its off-line mode. In the off-line mode the unit stores the data records from SSU 48 in memory 110 of the recovery unit.

In a second off-line step 248, the recovery unit is moved from its location in proximity to SSU 48 to a location wherein it can connect to the recovery processor. The recovery unit connects to the recovery processor and transfers the stored data records from its memory 110 to the recovery processor. The unsuccessful establishment of communication in decision 242, and the functions performed in steps 246 and 248, are described above for routing method 210 (FIG. 7) and routing method 220 (FIG. 8).

In a final step 250, the recovery processor processes the data records, received via steps 238, 244, or 248, to recover the data represented by the records, and stores the recovered data, typically in a storage medium such as secondary storage device 32.

In some embodiments, rather than an actual disaster event occurring, an operator of system 20 may activate control unit 64 to simulate the occurrence of a disaster event, so that such an event is deemed to have occurred. The operator may perform such an activation for testing purposes, or for other reasons, such as becoming aware of an impending terrorist attack or becoming concerned of a possible flood, storm, or fire. Those having ordinary skill in the art will be able to adapt the description of flowchart 230, mutatis mutandis, to cover the case of an operator activating the control unit. Typically such adaptation comprises replacing the first step of the flowchart by a step wherein the operator activates control unit 64. In addition, the adaptation may include the operator manually selecting which path to follow, from each decision step in the flowchart.

The above description has referred in a number of instances to software used to drive a processor in a computing device, for example processor 44. The software may be downloaded to the computing device in electronic form, over a network, for example, or it may alternatively be supplied to the computing device on tangible media, such as CD-ROM.

As noted above, SSU 48 may comprise a wireless transmitter coupled to a communication antenna. The transmitter is typically powered by power source. The transmitter is used for transmitting the records stored in the SSU memory to a wireless receiver, when the communication between SSU 48 and processor 44 is broken due to a disaster event. As such, the transmitter and antenna serve as alternative communication means for transmitting information from SSU 48. Using the wireless channel, data stored in the secure storage unit can be retrieved and reconstructed within minutes. Alternative retrieval methods, which involve physically locating and retrieving the secure storage unit, may sometimes take several hours or even days.

The transmitter may comprise, for example, a cellular transmitter, a WiMax transmitter, or any other suitable data transmitter type. The remote wireless receiver is coupled to a receiving antenna. The remote receiver and antenna may be connected to the secondary storage device or to the recovery processor.

In some embodiments in which two or more secure storage units are used in a redundant configuration, the wireless transmitter in each SSU 48 is typically assigned a different communication channel so as to avoid collisions among the transmissions of neighboring wireless transmitters. Additionally or alternatively, similar channel coordination may be performed for the homing devices of neighboring SSUs 48.

In order to shorten the time needed for transferring the data over the wireless channel, the remote receiver may be configured to receive two or more wireless channels in parallel. When the two or more secure storage units begin transmitting, the receiver may choose to receive these transmissions simultaneously, thus receiving different parts of the data from each of the secure storage units.

When two or more SSUs 48 are used, different transmitters in different SSUs 48 may be configured to transmit on different networks (e.g., cellular networks of different service providers). This network diversity increases the likelihood of successful data transfer even when a particular wireless network fails during the disaster.

In some embodiments, the functions of the SSU homing device, transmitter and antennas can be performed by a single transmitter and a single antenna. For example, several methods are known in the art for determining the position of a cellular transmitter. Such methods can be used to locate the wireless transmitter when it transmits data from SSU 48, thus eliminating the need for a separate homing device.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A recovery unit, comprising:
   a transceiver, which is configured to communicate in accordance with a same wireless protocol that is also designated for normal wireless communication between a secure storage unit and a wireless network; and
   a processor, which is configured, when the normal wireless communication between the secure storage unit and the wireless network is unavailable due to a disaster event and the recovery unit is brought into proximity with the secure storage unit, to control the transceiver to communicate with the secure storage unit directly, using the same wireless protocol used for the normal wireless communication but regardless of authentication of the secure storage unit by the wireless network, to recover data from the secure storage unit, and to locally store the recovered data in a memory at the recovery unit.

2. The recovery unit according to claim 1, wherein a primary storage device stores a first copy of the data, and wherein a second storage device is configured to provide an indication of successful storage of the data after a second copy of the data is stored therein, and wherein the primary storage device provides the indication to the secure storage unit.

3. The recovery unit according to claim 1, wherein the secure storage unit is configured to delete the records after receipt of an indication of successful storage of the data.

4. The recovery unit according to claim 1, wherein the secure storage unit comprises a memory having an identification section providing a unique identity for the secure storage unit.

5. The recovery unit according to claim 4, wherein the identification section comprises a subscriber identity module.

6. The recovery unit according to claim 4, wherein the transceiver is configured to only communicate with the secure storage unit in response to the secure storage unit transmitting the unique identity to the transceiver.

7. The recovery unit according to claim 1, wherein the recovery unit further comprises a satellite terminal which is configured to communicate with the wireless network via a satellite network.

8. The recovery unit according to claim 7, wherein the wireless network comprises one of a cellular network, a WiMax network, and a WiFi network.

9. The recovery unit according to claim 7, wherein, in an on-line mode of operation of the recovery unit, the processor is configured to relay the recovered data from the transceiver to the satellite terminal.

10. The recovery unit according to claim 9, wherein, in an off-line mode of operation of the recovery unit, the processor is configured to store the recovered data in the memory and not relay the recovered data to the satellite terminal.

11. The recovery unit according to claim 10, wherein the recovery unit is configured to initially operate in the on-line mode, and to operate in the off-line mode after determining that operation in the on-line mode is unsuccessful.

12. The recovery unit according to claim 1, wherein the transceiver and the processor are configured to communicate with a recovery processor which is configured to receive and store the recovered data in a non-volatile storage medium.

13. The recovery unit according to claim 1, wherein the transceiver comprises one of a femtocell base station and a picocell base station.

14. The recovery unit according to claim 1, wherein the transceiver comprises cellular test equipment that is configured to emulate a cellular base station.

15. The recovery unit according to claim 1, wherein the secure storage unit is configured to communicate only with the transceiver.

16. The recovery unit according to claim 1, wherein the transceiver is configured to communicate concurrently with multiple secure storage units.

17. The recovery unit according to claim 1, wherein the processor is configured to authenticate the secure storage unit instead of the authentication of the secure storage unit by the wireless network.

18. The recovery unit according to claim 17, wherein the processor is configured to obtain authentication information from the wireless network while able to communicate with the wireless network, to store the authentication information in the memory, and to subsequently authenticate the secure storage unit using the stored authentication information regardless of ability to communicate with the wireless network.

19. A method for recovering data, comprising:
   holding data in a secure storage unit that is configured to conduct normal wireless communication with a wireless network; and
   when the normal wireless communication between the secure storage unit and the wireless network is unavailable due to a disaster event, bringing the recovery unit into proximity with the secure storage unit;
   communicating between the recovery unit and the disaster-proof storage unit directly, using a same wireless protocol used for the normal wireless communication but regardless of authentication of the secure storage unit by the wireless network, so as to recover data from the secure storage unit; and
   locally storing the recovered data in a memory at the recovery unit.

20. A data recovery apparatus, comprising:
   a secure storage unit, which is configured to conduct normal wireless communication with a wireless network; and
   a recovery unit, which is configured, when the normal wireless communication between the secure storage unit and the wireless network is unavailable due to a disaster event and the recovery unit is brought into proximity with the secure storage unit, to communicate with the secure storage unit directly, using a same wireless protocol used for the normal wireless communication but regardless of authentication of the secure storage unit by the wireless network, to recover data from the secure storage unit, and to locally store the recovered data in a memory at the recovery unit.

21. A recovery unit, comprising:
   a transceiver, which is configured to communicate in accordance with a same wireless protocol that is also designated for normal wireless communication between a secure storage unit and a wireless network; and
   a processor, which is configured, when the normal wireless communication between the secure storage unit and the wireless network is unavailable due to a simulated disaster event and the recovery unit is brought into proximity with the secure storage unit, to control the transceiver to communicate with the secure storage unit directly, using the same wireless protocol used for the normal wireless communication but regardless of authentication of the secure storage unit by the wireless network, to recover data from the secure storage unit, and to locally store the recovered data in a memory at the recovery unit.

22. A method for recovering data, comprising:

holding data in a secure storage unit that is configured to conduct normal wireless communication with a wireless network; and when the normal wireless communication between the secure storage unit and the wireless network is unavailable due to a simulated disaster event, bringing the recovery unit into proximity with the secure storage unit;

communicating between the recovery unit and the secure storage unit directly, using a same wireless protocol used for the normal wireless communication but regardless of authentication of the secure storage unit by the wireless network, so as to recover data from the secure storage unit; and locally storing the recovered data in a memory at the recovery unit.

\* \* \* \* \*